United States Patent [19]
Saujet et al.

[11] Patent Number: 5,570,578
[45] Date of Patent: Nov. 5, 1996

[54] HEAT RECOVERY METHOD AND DEVICE SUITABLE FOR COMBINED CYCLES

[75] Inventors: Jean-François Saujet, Asnieres; Pascale Amadieu, Velizy; Georges Hubert, Paris; Francine Hrisafovic, Antony; Jean-Xavier Morin, Neuville Aux Bois, all of France

[73] Assignee: Stein Industrie, Velizy-Villacoublay, France

[21] Appl. No.: 159,541

[22] Filed: Dec. 1, 1993

[30] Foreign Application Priority Data

Dec. 2, 1992 [FR] France ..................... 92 14511

[51] Int. Cl.$^6$ .................. F01K 7/00; F22B 1/00
[52] U.S. Cl. .................. 60/647; 60/676; 60/677; 60/679; 122/1 R
[58] Field of Search .............. 60/647, 655, 676, 60/677, 679; 122/1 R, 1 C, DIG. 5

[56] References Cited

U.S. PATENT DOCUMENTS

| | | | |
|---|---|---|---|
| 4,702,081 | 10/1987 | Vinko | 60/655 |
| 5,044,163 | 9/1991 | Brückner et al. | 60/677 |
| 5,109,665 | 5/1992 | Hoizumi et al. | 60/676 |
| 5,181,381 | 1/1993 | Gounder | 60/676 |
| 5,327,726 | 7/1994 | Daman et al. | 60/676 |

FOREIGN PATENT DOCUMENTS

| | | |
|---|---|---|
| 0197378 | 10/1986 | European Pat. Off. . |
| 845202 | 8/1960 | United Kingdom . |
| WO8605234 | 9/1986 | WIPO . |

OTHER PUBLICATIONS

Wood, Bernard D., *Applications of Thermodynamics*, 2nd ed., Addison–Wesley Pub. Co., © 1982, pp. 26–27.
GEC Alsthom Technical Review, No. 4, Jan. 1991, Paris, France, pp. 15–26, J. Paren: "Combined Cycle Plants".

*Primary Examiner*—Leonard E. Heyman
*Attorney, Agent, or Firm*—Sughrue, Mion, Zinn, Macpeak & Seas

[57] ABSTRACT

A heat recovery method is disclosed suitable for combined gas turbine/steam turbine cycles including at the exhaust of a gas turbine a waste heat boiler in which water is first treated in a degassing unit connected to a first evaporator and comprising a certain number of heat exchangers. The boiler uses an ultrasupercritical steam cycle with four pressure levels with subcritical fluid intermediate evaporator stages.

7 Claims, 4 Drawing Sheets

HEAT RECOVERY METHOD AND DEVICE SUITABLE FOR COMBINED CYCLES

BACKGROUND OF THE INVENTION

1. Field of the invention

The present invention concerns a heat recovery method and device suitable for combined cycles.

It is more particularly concerned with a heat recovery method suitable for combined gas turbine/steam turbine cycles. The method utilizes a waste heat boiler at the exhaust of a gas turbine. The water in the boiler is first treated in a degassing unit connected to a first evaporator.

2. Description of the prior art

Combined cycles using gas turbines and steam turbines are a known method of producing electricity from natural gas or petroleum products. The steam cycle used is normally of the sub-critical type (at 110 bars) and comprises two or three pressure levels (110 bars, 28 bars, 4.6 bars) for increased overall thermal efficiency. Recent increases in gas turbine size and gas turbine exhaust temperatures also enable the steam cycles to be enhanced by introducing a reheater (approximately 540° C.). The raw overall thermal efficiency of the cycle is thereby increased from 52.1 to 55.2%. However, the need to reduce emission of carbon dioxide and nitrogen oxides is encouraging further research into improving cycle overall thermal efficiency which is still deemed to be insufficient, especially under part-load conditions.

It is also known to use super critical steam cycles with only one pressure level, burning powdered coal to produce electricity with a high overall thermal efficiency (42 to 44%). However, further development of this technique is impeded by the problem of high-temperature corrosion of the terminal exchangers by sulfur and chlorine containing substances. An additional problem is caused by the mechanical strength of the screen materials. The addition of a flue gas treatment plant to reduce the emission of nitrogen and sulfur oxides significantly complicates operation and significantly increases the investment cost.

The circulating fluidized bed combustion technique can now be substituted for the combustion of powdered coal in a range of electrical powers below 300 MW as it can substantially reduce in situ the emission of oxides without requiring any additional processing of the flue gas.

The presence of fluidized bed exchangers, also called external beds, the principle of which is described in French patent FR-2 353 332, enables installation of high-temperature exchangers in a non-corrosive gas/solids environment with extremely high exchange coefficients and lends itself particularly well to a supercritical cycle configuration. Supercritical cycle size. For economic reasons associated with the additional investment costs, increasing the size of circulating fluidized bed boilers leads to a relatively much greater contribution of these fluidized bed exchangers to the thermal exchanges in the boiler loop. Therefore, these exchangers then constitute the only item which can be extrapolated, which is extremely favorable. Although highly advantageous from the economic and operating points of view, the overall thermal efficiency of this circulating fluidized bed combustion technique is limited. The efficiency is limited by the use of steam turbines with inlet pressures and temperatures currently around 275 bars and 565° C. for live steam, producing an overall thermal efficiency of 42 to 44%. Also, part-load overall thermal efficiency is deemed to be insufficient as, in this case, the boiler operates under subcritical conditions.

It may appear advantageous to combine a gas turbine and a circulating fluidized bed at the level of their water steam cycles to increase the overall thermal efficiency of the overall cycle. However, the problem of using known plants such as a boiler on the exhaust side of a gas turbine with three subcritical pressure levels and a circulating fluidized bed boiler with one supercritical pressure level is complex to solve and to optimize. It would obviously be possible to transfer exchanges by, for example, superheating the intermediate pressure gas turbine steam in the circulating fluidized bed but this is not the optimum arrangement from the overall thermal efficiency point of view.

It would also be possible to effect the recovery of heat on the exhaust side of the gas turbine in supercritical mode with one pressure level but this has the drawback of degraded overall thermal efficiency under part-load conditions because of the resulting subcritical operation with one pressure level.

An additional problem may be caused by the further presence of a waste heat boiler on the output side of a gasifier used to convert a solid fuel into gas. The solid fuel can be substituted for natural gas used in a gas turbine which enables solid fuel to be used for the entire cycle. For reasons of corrosion by sulfur and chlorine containing substances, the temperature of the fluid heated by this boiler must be limited to keep the temperature of the exchanger tubes below a threshold value above which rapid corrosion occurs. This waste heat boiler is currently of the subcritical type with one pressure level. This metal temperature limitation degrades the return in terms of the sensible heat content of the gas from the gasifier. For this reason gasification in a carbon conversion stage with fused ash has limitations in terms of cycle overall efficiency.

Gasification with carbon conversion in two stages appears to be more beneficial as there may then be practised in a fluidized bed in situ capture of sulfur by limestone to form calcium sulfide, which reduces the concentration of corrosive sulfur-containing substances in the waste heat boiler on the output side of the gasifier. The carbon-containing residue from the gasification process can then be burned in the circulating fluidized bed boiler.

The present invention proposes a heat recovery method which can significantly increase the overall efficiency of the cycle.

SUMMARY OF THE INVENTION

To this end the boiler on the exhaust side of the gas turbine uses an ultrasupercritical steam cycle with four pressure levels with intermediate evaporation of subcritical fluids, the expression "ultrasupercritical pressure" meaning pressures above 280 bars.

The increased overall efficiency results from the adoption of ultrasupercritical conditions and from the number of pressure levels which makes it possible to reduce very significantly the gap between the flue gas cooling curve and the heating/evaporation curves of the various fluids at the various pressures.

This closeness of the temperatures of the fluid to be heated and the hot fluid then can optimize the economic return in terms of the available energy by expansion in the stages of the steam turbine to produce a cycle overall efficiency which is very much higher than that obtained conventionally.

In a preferred embodiment the four pressure levels P1, P2, P3, P4 are in the following ranges:

P1 between 4 and 10 bars.

P2 between 20 and 40 bars.

P3 between 70 and 120 bars.

P4 above 280 bars.

In one specific embodiment they are 6, 28, 96 and 320 bars.

The heat exchangers between the evaporation stages are advantageously interleaved.

The plant for implementing this method comprises the following sequence of units:

a first evaporator connected to a degassing unit feeding the circuits at the four pressure levels;

at least four economizer type exchangers for the four fluids at the four pressure levels;

an evaporator at the first pressure level;

at least three economizer type heat exchangers for the three fluids at the second, third and fourth pressure levels;

an evaporator at the second pressure level;

at least one superheater for steam at the first pressure level connected to the outlet for steam at the first pressure level;

at least two economizer type exchangers for the two fluids at the third and fourth pressure levels;

an evaporator at the third pressure level;

at least one superheater for steam at the second pressure level connected to the outlet for steam at the second pressure level;

at least two economizer and superheater type exchangers for the two fluids at the third and fourth pressure level, the exchanger for the fluid at the third pressure level being connected to the outlet for steam at the third pressure level;

at least one steam exchanger at the fourth pressure level;

at least three exchangers of which a first reheats the mixture of fluids at the third pressure level, a second of which reheats the mixture of fluids at the second pressure level and a third of which superheats the steam at the fourth pressure level and is connected to the outlet for steam at the fourth pressure level.

The invention also concerns a preferred application in a heat recovery installation for a combined cycle using a gas turbine and a steam turbine with a high-pressure stage, a first intermediate pressure stage, a second intermediate pressure stage and a low-pressure stage in which the high-pressure stage of the steam turbine is fed with steam at the ultrasupercritical fourth pressure level from the waste heat boiler and with the fluid from the degassing unit of said boiler heated by exchangers of a circulating fluidized bed boiler.

A waste heat boiler on the output side of a gasifier is advantageously associated with the circulating fluidized bed boiler, the steam fed to the high-pressure stage of the steam turbine from the degassing unit being also heated by this boiler.

According to another feature of the invention, the first intermediate pressure stage of the steam turbine is fed with exhaust steam from the high-pressure stage of the steam turbine reheated in part by exchangers of a circulating fluidized bed boiler and in part by a reheater at the third pressure level of the waste heat boiler, with steam at the third pressure level from the waste heat boiler added at the input of the reheater.

According to another feature of the invention the second intermediate pressure stage of the steam turbine is fed with exhaust steam from the first intermediate pressure stage of the steam turbine reheated in part by exchangers of a circulating fluidized bed boiler and in part by a reheater at the second pressure level of the waste heat boiler, with steam at the second pressure level from the waste heat boiler added at the input of the reheater.

The invention is described in more detail hereinafter with reference to the figures which show a preferred embodiment of the invention.

DETAILED DESCRIPTION OF THE INVENTION

Figure 1:
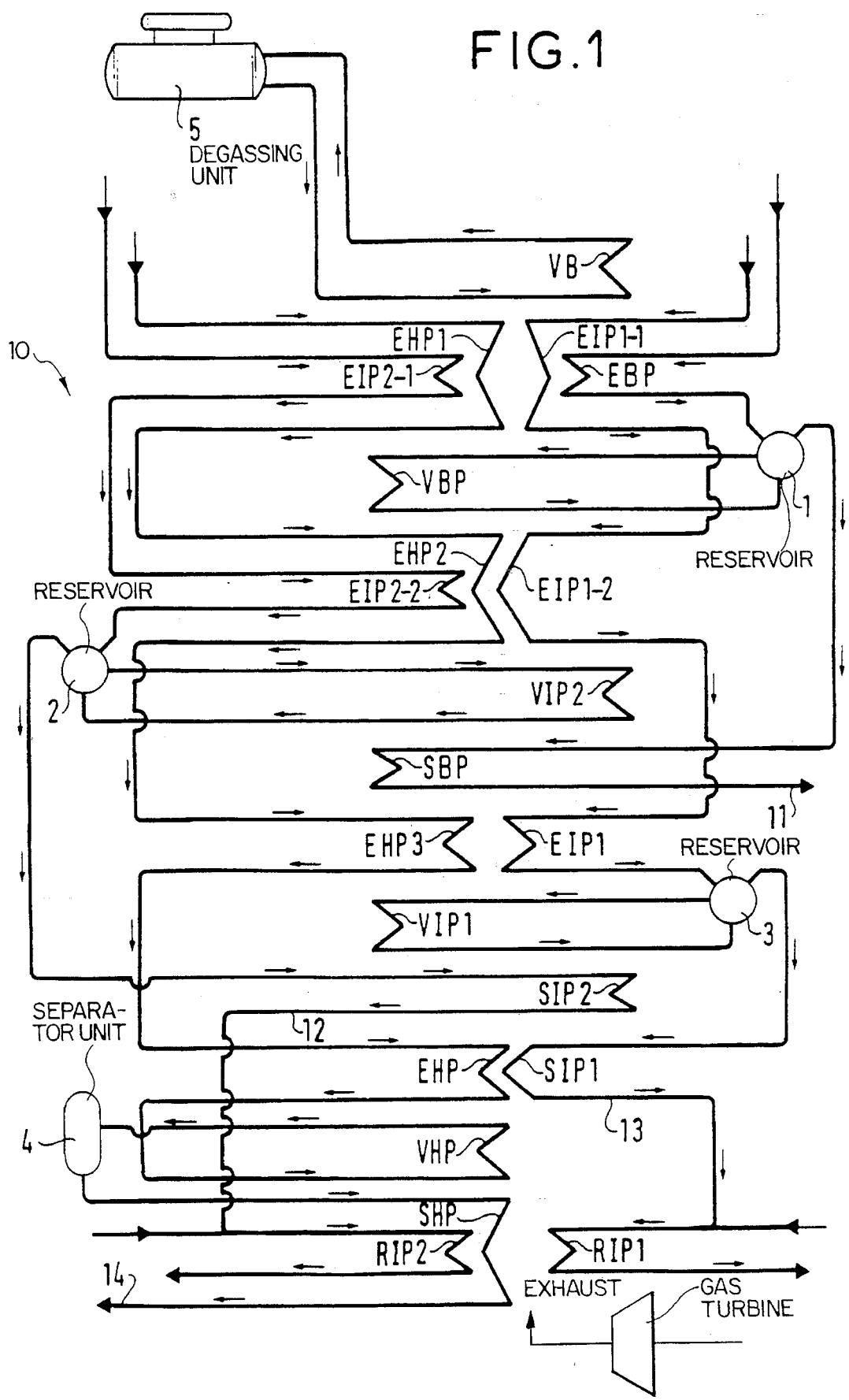
FIG. 1 is a plant schematic of a waste heat boiler in accordance with the invention.

FIG. 1 shows the heat exchange plant of a waste heat boiler at the exhaust from a gas turbine in which the water is first treated in a degassing unit 5 connected to a first evaporator and comprising a certain number of heat exchangers. This boiler than uses an ultrasupercritical steam cycle with four pressure levels P1, P2, P3, P4 with intermediate subcritical fluid evaporator stages.

To be more precise, the four pressure levels P1, P2, P3, P4 are in the following ranges:

P1 between 4 and 10 bars.

P2 between 20 and 40 bars.

P3 between 70 and 120 bars.

P4 greater than 280 bars and preferably between 280 and 350 bars.

In one specific embodiment they are 6, 28, 96 and 320 bars.

As shown in FIG. 1 the heat exchangers between the evaporator stages are interleaved.

The plant comprises the following sequence of units:

a first evaporator VB connected to a degassing unit 5 feeding the circuits at the four pressure levels P1, P2, P3, P4;

at least four economizer type exchangers EHP1, EIP2-1, EIP1-1, EBP for the four fluids at pressures P1 to P4;

an evaporator VBP at the pressure P1 connected to a reservoir 1;

at least three economizer type heat exchangers EHP2, EIP2-2, EIP1-1 for the three fluids at the pressures P2, P3 and P4;

an evaporator at pressure P2 connected to a reservoir 2;

at least one superheater SBP for steam at pressure P1 connected to the outlet 11 for steam at the pressure P1;

at least two economizer type exchangers EIP1, EHP3 for the two fluids at pressures P3 and P4;

an evaporator VIP1 at pressure P3 connected to a reservoir 3;

at least one superheater SIP2 for steam at pressure P2 connected to the outlet 12 for steam at the pressure P2;

at least two economizer and superheater type exchangers EHP, SIP1 for the two fluids at pressures P3 and P4, the exchanger SIP1 for the fluid at pressure P3 being connected to the outlet 13 for steam at the pressure P3;

at least one exchanger VHP at pressure P4, possibly connected to a separator unit 4;

at least three exchangers of which a first RIP1 reheats the mixture of fluids at pressure P3, a second of which RIP2 reheats the mixture of fluids at pressure P2 and a third of which SHP superheats the steam at pressure P4 and is connected to the outlet 14 for steam at the pressure P4.

Figure 2:
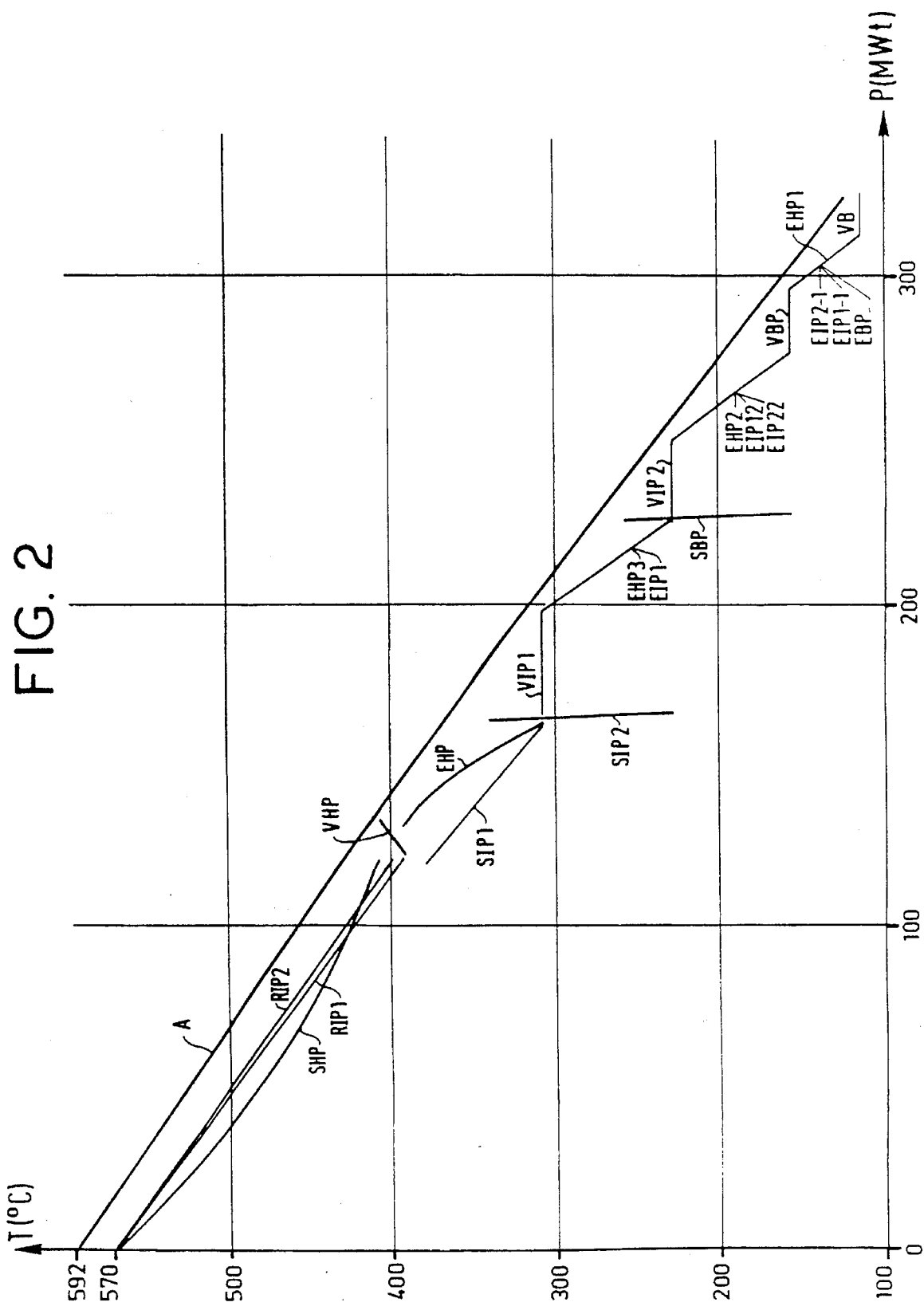
FIG. 2 shows the plant temperatures of a waste heat boiler in accordance with the invention.

FIG. 2 shows the operation of the plant described above. The power exchanged by the exchangers is plotted on the abscissa axis and the temperature of the fluid in the exchangers is plotted on the ordinate axis.

This graph shows the result achieved by the optimal arrangement of the plant. The flue gas cooling curve (curve A) is very close to the curve of heating and evaporation of the fluids at the various pressures.

The overall efficiency is therefore optimized and, compared with a cycle configuration with three subcritical pressures, the overall efficiency of an installation using a 212 electrical megawatt gas turbine is increased from 55.2 to 57% approximately by the invention, the overall efficiency depending on the acid dew point of the flue gas, which governs the choice of the flue temperature and is itself dependent on the sulfur content of the fuel, and on the temperature of the cold source of the cycle.

Figure 3:
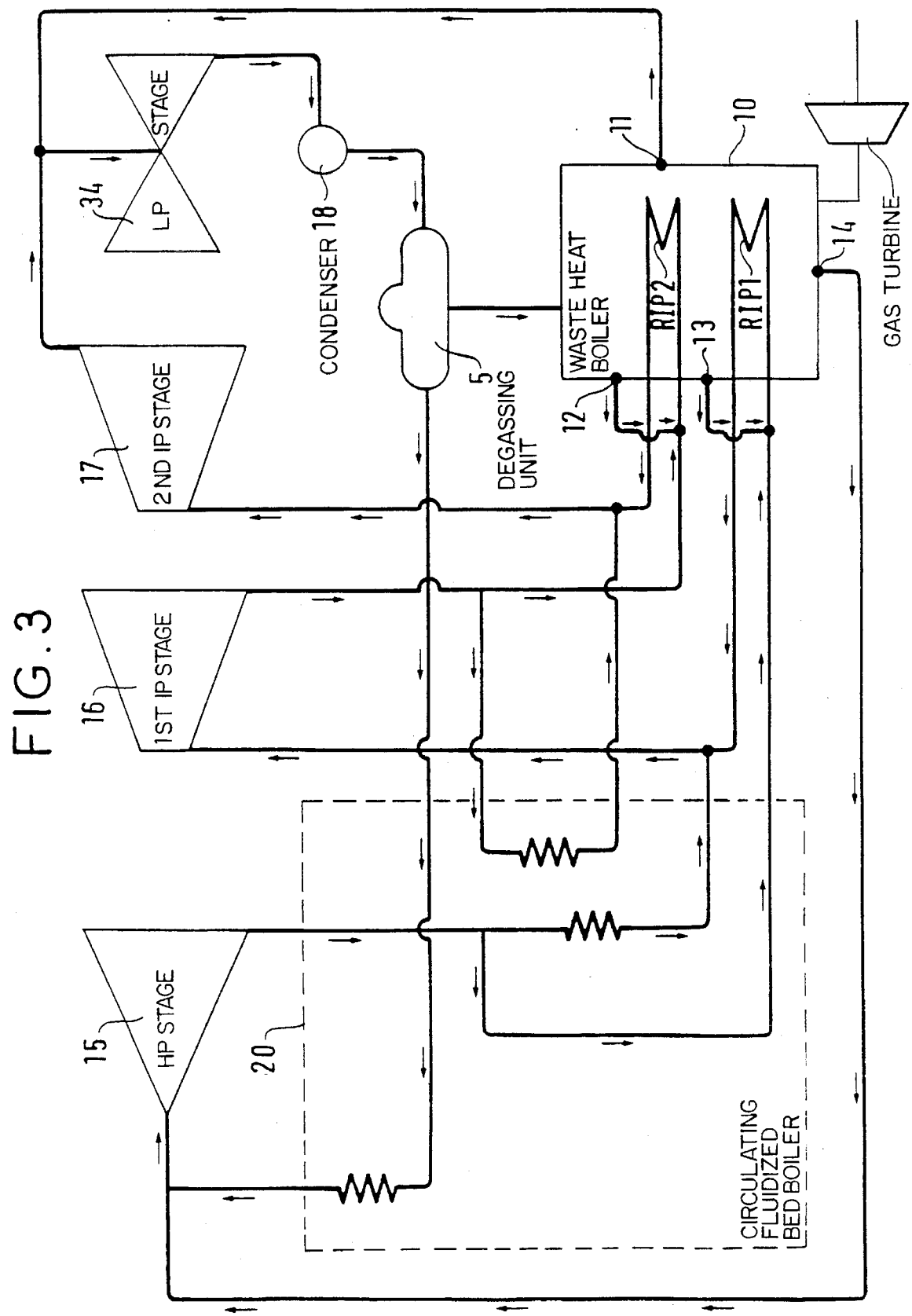
FIG. 3 is a diagram showing a preferred application of said plant to form a combined cycle installation.

FIG. 3 shows a preferred application of the waste heat boiler described above.

The boiler 10 is installed at the exhaust end of a gas turbine. The figure shows the outlet 11 for steam at the pressure P1, the outlet 12 for steam at the pressure P2, the outlet 13 for steam at the pressure P3, the outlet 14 for steam at the pressure P4 and the reheaters RIP1 and RIP2.

The steam at the ultrasupercritical pressure P4 is sent directly to the high-pressure stage 15 of a steam turbine. The high-pressure stage 15 also receives steam from the degassing unit 5 of the waste heat boiler 10 heated in a circulating fluidized bed boiler 20, as explained later.

At the exhaust from the high-pressure stage 15 the steam to be reheated is treated partly in the circulating fluidized bed boiler 20. Part is fed directly to the reheater RIP1 of the waste heat boiler 10 after steam at the pressure P3 from the outlet 13 of the waste heat boiler 10 is added to it. From the outlet of the reheater RIP1 it feeds the first intermediate pressure IP1 stage 16 of the steam turbine. Another part is reheated in the circulating fluidized bed boiler 20 to feed directly the IP1 stage 16 of the steam turbine.

This arrangement enables decoupled operation of the two steam generators and therefore authorizes operation with only the gas turbine supplied with natural gas or operation with only the circulating fluidized bed supplied with a back up fuel. This increases the overall availability of the installation.

At the exhaust from the IP1 stage 16 of the steam turbine some of the steam to be reheated is sent to the reheater RIP2 of the boiler 10, after steam at the pressure P2 from the outlet 11 of the waste heat boiler 10 is added to it, and another part is reheated in the circulating fluidized bed boiler 20. This reheated steam from the outlet of the reheater RIP2 and from the circulating fluidized bed boiler 20 is fed to the second intermediate pressure IP2 stage 17 of the steam turbine.

This complements the possibility of decoupled operation of the two steam generators as mentioned above.

Steam from the exhaust of the IP2 stage 17 is fed to the low-pressure LP stage 34 of the steam turbine. The outlet 11 of the waste heat boiler 10 for steam at the pressure P1 is connected to the low-pressure LP stage 34 of the steam turbine.

The steam from the exhaust of this low-pressure LP stage 34 is sent to a condenser with an extractor pump 18 to feed fluid to the degassing unit 5.

Figure 4:
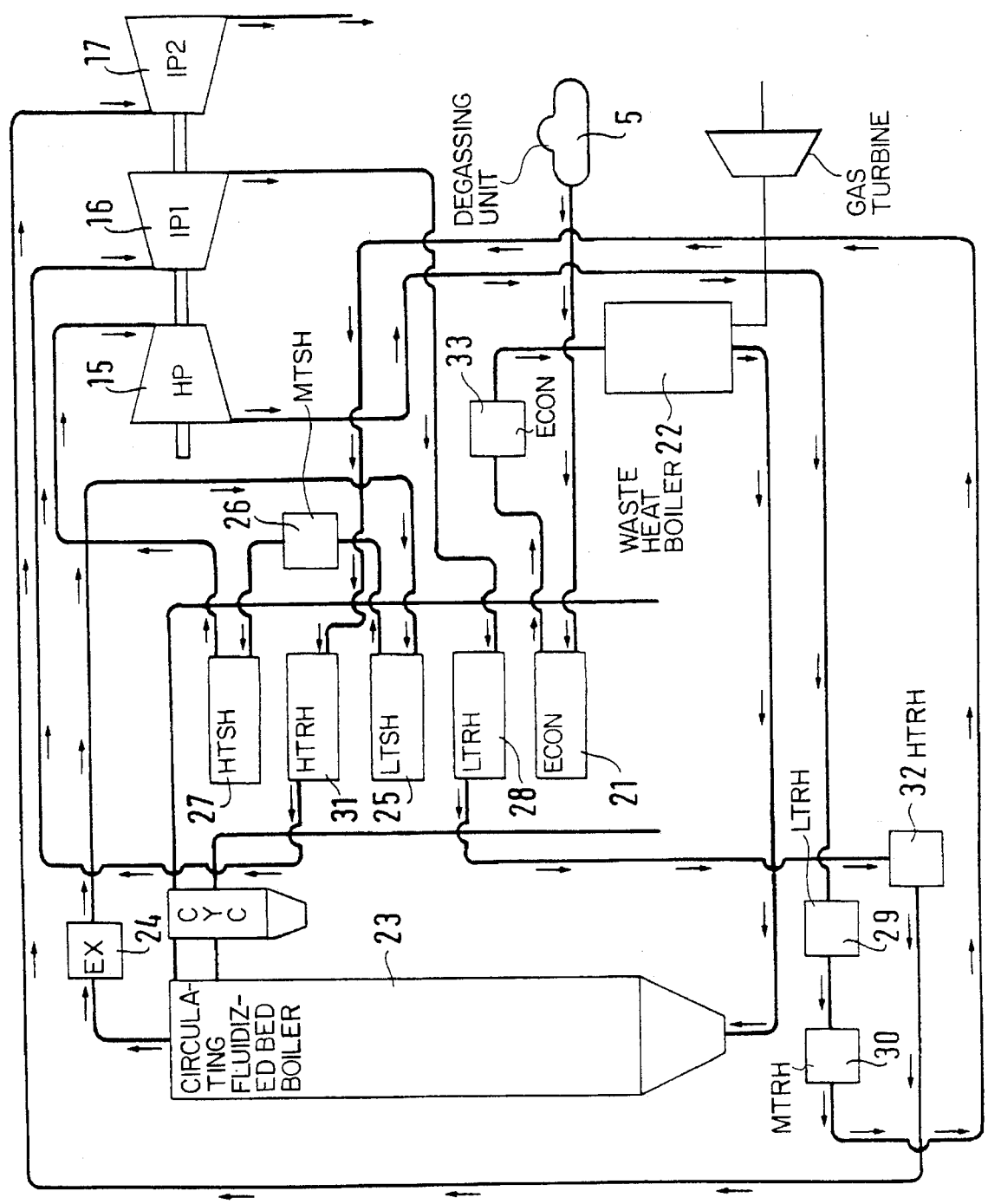
FIG. 4 is a diagram showing the circulating fluidized bed boiler system of this installation.

The heat recovery system of the circulating fluidized bed boiler 20 will now be described with reference to FIG. 4.

To feed the high-pressure stage 15 of the steam turbine the fluid from the degassing unit 5 is sent to economizers 21 and 33, then to a waste heat boiler 22 of an associated gasifier, if any, and is then heated by the fluidized bed boiler 23. The resulting steam is fed to an exchanger 24 constituting the rear cage and the rear cage suspension of the fluidized bed boiler 20, to a low-temperature superheater 25 in the fluidized bed boiler 20, to a medium-temperature superheater 26 in one of the external beds and then to a final high-temperature superheater 27. The resulting steam feeds the high-pressure stage 15 of the steam turbine in combination with steam at the pressure P4 from the waste heat boiler.

The steam from the exhaust of the high-pressure stage 15 to be reheated by the circulating fluidized bed boiler 20 is passed to low- and medium-temperature reheaters 29 and 30 in the external bed and then to a high-temperature reheater 31. The resulting steam feeds the IP1 stage 16 of the steam turbine in combination with steam from the reheater RIP1 of the waste heat boiler 10.

The steam from the exhaust of the IP1 stage 16 of the steam turbine to be reheated by the circulating fluidized bed boiler 20 is fed to a low-temperature reheater 28, to high-temperature reheaters 32 in the external beds. The resulting steam feeds the IP2 stage 17 of the steam turbine in combination with steam from the reheater RIP2 of the waste heat boiler 10.

The circulating fluidized bed boiler 20 can therefore partially reheat the fluid mixed subsequently with the steam at pressures P2 and P3 coming direct from the waste heat boiler 10 before feeding to the stages 16, 17 of the steam turbine.

The pressure levels are therefore compatible and the thermal exchanges between the various units of the installation are therefore consistent with an ultrasupercritical cycle.

The detailed description of the configuration of the exchangers in the circulating fluidized bed boiler is given by way of purely illustrative example and it is obvious that other arrangements intended to minimize the exchange surface areas installed in the circulating fluidized bed boiler are possible without departing from the scope of the invention.

There is claimed:

1. Apparatus for implementing a heat recovery method suitable for combined gas turbine/steam turbine plant, said apparatus using an ultrasupercritical steam cycle operating at a first, second, third and fourth pressure levels and using a combination of interleaved heat exchangers and subcritical fluid intermediate evaporator stages, said apparatus comprising:

a degassing unit for feeding circuits at said four pressure levels;

a first evaporator connected to said degassing unit;

a first group of at least four economizer type exchangers, connected to said degassing unit, for receiving fluids at said first, second, third and fourth pressure levels;

a first reservoir connected to one of said exchangers of said first group for receiving one of said fluids;

a second evaporator connected to said first reservoir and operating at said first pressure level;

a second group of at least three economizer type heat exchangers connected to at least three economizer type heat exchangers of said first group for receiving fluids at said second, third and fourth pressure levels;

a second reservoir connected to one of said exchangers of said second group;

a third evaporator connected to said second reservoir and operating at said second pressure level;

at least one first superheater, connected to said first reservoir, for outputting steam at said first pressure level;

a third group of at least two economizer type exchangers connected to at least two economizer type heat exchangers of said second group, for receiving said fluids at said third and fourth pressure levels;

a third reservoir connected to one of said exchangers of said third group;

a fourth evaporator connected to said third reservoir and operating at said third pressure level;

at least one second superheater connected to said second reservoir, for outputting steam at said second pressure level;

a fourth group of at least two economizer and superheater type exchangers connected to at least two exchangers of said third group for receiving said fluids at said third and fourth pressure levels, said exchanger for said fluid at said third pressure level being connected to an outlet for steam at said third pressure level;

a fifth group of at least one exchanger connected to at least one exchanger of said fourth group and operating at said fourth pressure level;

a sixth group of at least three exchangers, a first one of said exchangers of said sixth group receiving and reheating fluids at said third pressure level from said exchanger of said fourth group for said fluid at said third pressure level, a second one of said exchangers of said sixth group receiving and heating fluids at said second pressure level from said second superheated and a third one of said exchangers of said sixth group superheating steam at said fourth pressure level from said exchanger of said fifth group, said third exchanger being connected to a outlet for outputting steam at said fourth pressure level.

2. A heat recovery method suitable for combined gas turbine/steam turbine cycles, comprising the steps of:

receiving in a waste heat boiler gas exhaust from a gas turbine;

passing water through an evaporator of said waste heat boiler;

treating said water in a degassing unit of said waste heat boiler;

passing said treated water through an evaporator of said waste heat boiler;

passing outputs of said degassing unit through a plurality of heat exchangers and subcritical fluid intermediate evaporator stages utilizing an ultrasupercritical steam cycle, wherein said cycle operates at a first, second, third and fourth pressure levels, said first, second, third and fourth pressure levels being 6, 28, 96 and 320 bars, respectively; and producing steam outputs at each of said four pressure levels.

3. Method according to claim 1 wherein the heat exchangers and said evaporator stages are interleaved.

4. A heat recovery system for combined gas turbine/steam turbine cycles, said system comprising:

a waste heat boiler disposed at the exhaust of a gas turbine, said waste heat boiler having a degassing unit for treating water, a first evaporator connected to said degassing unit and a plurality of heat exchangers and subcritical fluid intermediate evaporator stages for receiving an output of said degassing unit; said waste heat boiler operating with an ultrasupercritical steam cycle at a first, second, third and fourth pressure levels; and a steam turbine having a high pressure stage, a first intermediate pressure stage, a second intermediate pressure stage and a low pressure stage; said high pressure stage being connected to receive steam at said fourth pressure level from said waste heat boiler and heated fluid from said degassing unit through a circulating fluidized bed boiler, said heated fluid being heated by exchangers of said circulating fluidized bed boiler.

5. The system according to claim 4, wherein said waste heat boiler further comprises a reheater, said reheater operating in conjunction with said circulating fluidized bed boiler for providing said heated fluid to said high pressure stage.

6. A heat recovery system for combined gas turbine/steam cycles, said system comprising:

a waste heat boiler disposed at the exhaust of a gas turbine, said waste heat boiler having a degassing unit for treating water, a first evaporator connected to said degassing unit and a plurality of heat exchangers and subcritical fluid intermediate evaporating stages for receiving an output of said degassing unit; said waste heat boiler operating with an ultrasupercritical steam cycle at a first, second, third and fourth pressure level; and a steam turbine having a high pressure stage, a first intermediate pressure stage, a second intermediate pressure stage and a low pressure stage; said first intermediate pressure stage receiving steam from exhaust of said high pressure stage, said steam being reheated by exchangers of a circulating fluidized bed boiler and by a reheater receiving steam at said third pressure level from said waste heat boiler.

7. A heat recovery system for a combined gas turbine/steam turbine cycles, said system comprising:

a waste heat boiler disposed at the exhaust of a gas turbine, said waste heat boiler having a degassing unit for treating water, a first evaporator connected to said degassing unit and a plurality of heat exchangers and subcritical fluid intermediate evaporating stages for receiving an output of said degassing unit; said waste heat boiler operating with an ultrasupercritical steam cycle at a first, second, third and fourth pressure level; and a steam turbine having a high pressure stage, a first intermediate pressure stage, a second intermediate pressure stage and a low pressure stage; said second intermediate pressure stage receiving steam from exhaust of said first intermediate pressure stage, said steam being reheated by exchangers of a circulating fluidized bed boiler and by a reheater receiving steam at said second pressure level from said waste heat boiler.

* * * * *